(12) United States Patent
Leslie et al.

(10) Patent No.: US 8,335,130 B1
(45) Date of Patent: Dec. 18, 2012

(54) ACOUSTIC ENERGY ARRAY AND SYSTEM

(76) Inventors: James M. Leslie, Pocatello, ID (US);
John M. Leslie, Jonesborough, TN (US)

( * ) Notice: Subject to any disclaimer, the term of this patent is extended or adjusted under 35 U.S.C. 154(b) by 623 days.

(21) Appl. No.: 11/880,062

(22) Filed: Jul. 19, 2007

Related U.S. Application Data

(60) Provisional application No. 60/833,530, filed on Jul. 26, 2006.

(51) Int. Cl.
*H02J 1/12* (2006.01)
(52) U.S. Cl. .................................................. 367/140
(58) Field of Classification Search .............. 367/140; 310/314, 322; 607/35
See application file for complete search history.

(56) References Cited

U.S. PATENT DOCUMENTS

| | | | | |
|---|---|---|---|---|
| 7,424,325 | B2 * | 9/2008 | Koller et al. | 607/35 |
| 2004/0073267 | A1 * | 4/2004 | Holzer | 607/35 |
| 2005/0256549 | A1 * | 11/2005 | Holzer | 607/35 |

* cited by examiner

*Primary Examiner* — Dan Pihulic

(57) ABSTRACT

An integrated acoustically generator-based system having a substrate, a plurality of micro generators (conversion apparatus) disposed on the substrate, the micro generators each generating a voltage output in response to acoustic vibrational energy received from the acoustic source, and at least one power processor disposed on the substrate, and the power processor being electrically coupled to outputs of the plurality of micro generators.

19 Claims, 1 Drawing Sheet

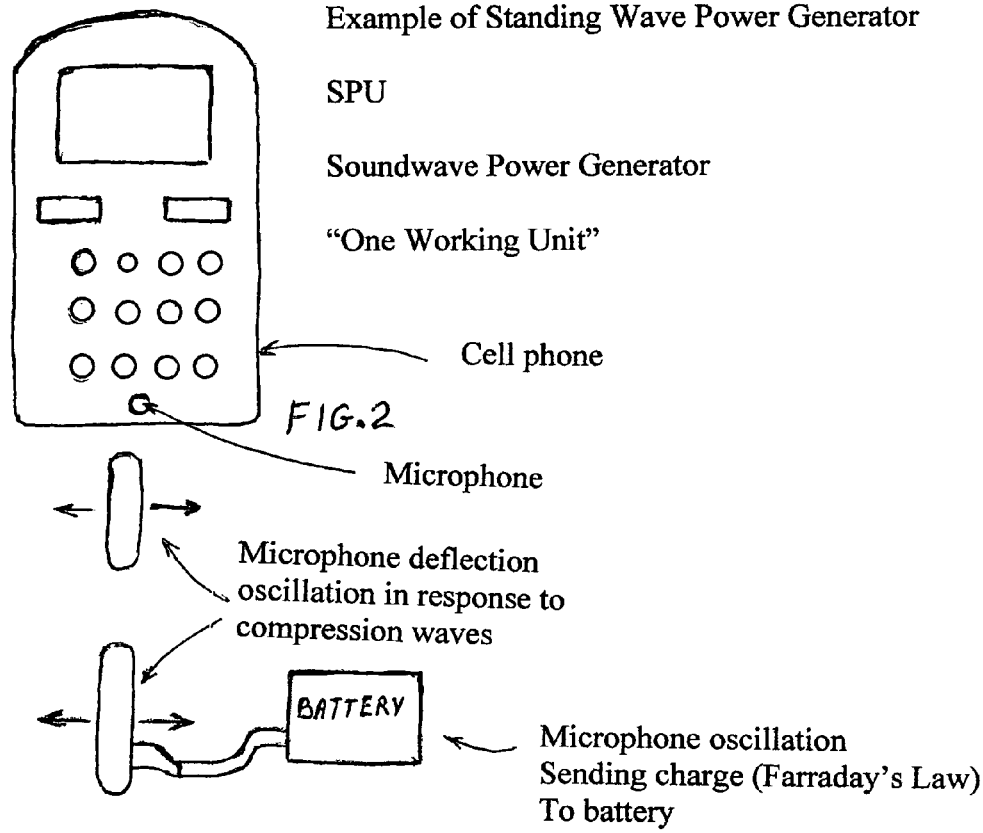
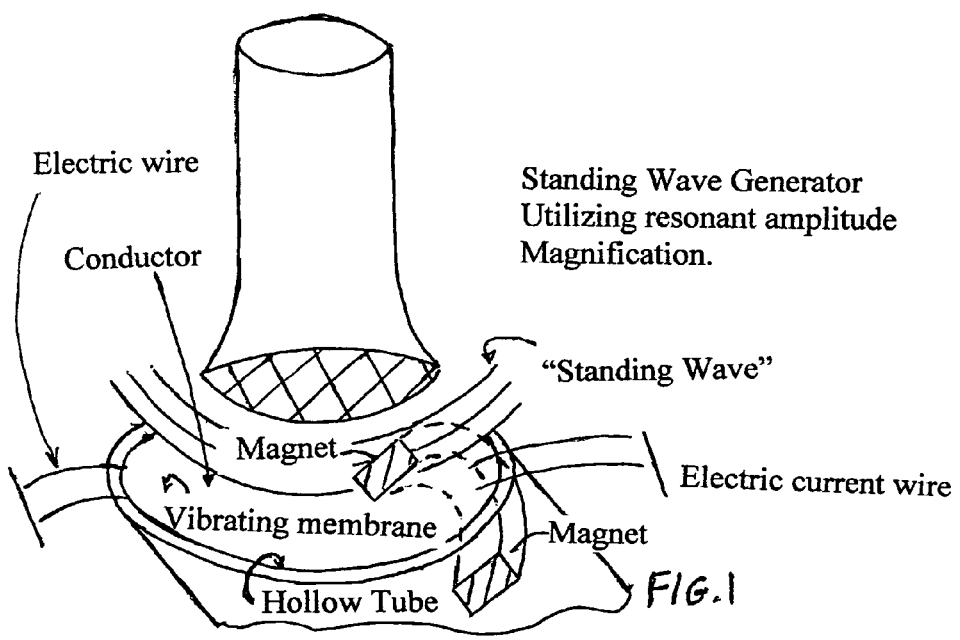

ACOUSTIC ENERGY ARRAY AND SYSTEM

This application claims priority under 35 U.S.C. 119(e)(1) based on Applicants Provisional U.S. Patent Application Ser. No. 60/833,530 Filed Jul. 26, 2006 and of same title.

BACKGROUND OF THE INVENTION

1. Field

The invention relates to power generators, more particularly, to self powered microsystem generators.

2. Background

Over the years there has been a growing interest in the field of nano technology providing an answer to our energy crisis. One specific area that has received little attention is how to supply the required power to drive an induction conversion or generator. Conventional power supplies, are a finite quantity and expensive. However, certain applications require the generators to be free standing entities. As a result, these generators typically need their own self-powered power supply. Batteries are not generally a viable solution. Batteries contain a finite amount of energy and have a limited lifetime. Batteries also can contain hazardous chemicals, can be quite bulky and can fail without notice.

Self powered Microsystems can convert energy from an existing energy source (con shell propagation of sound waves into a different form of energy, such as electrical energy). Electrical generators based on self powered Microsystems can be used to generate low noise electrical power, virtually eliminate cross talk between power lines and signal lines, and can operate efficiently with a relatively simple power delivery and control system.

Some possible energy sources which can be converted into electrical energy include light energy, thermal energy, volume flow energy and mechanical energy. However, mechanical vibrations may be the only feasible source of energy when the former energy sources are typically unavailable, such as in applications where there is no light, no flow, and zero temperature gradient.

The transformation of mechanical vibrations into electrical power is generally accomplished using the anatomical blueprint of the middle ear and a magnetic field being driven from the energy propagating from a conch shell in the form of sound waves. This results in a voltage being generated. For example, micro-mechanical generators (micro machined) may be constructed and placed in arrays on a suitable substrate (microchip). Although self powered Microsystems can generate their "own" energy, they generally require an energy storage device. Ideally the chosen energy storage device exhibits high power and energy densities with the smallest size possible. Batteries (e.g. In batteries) and capacitors, including super capacitors may be used as energy storage devices in conjunction with self powered Microsystems.

Vibrational energy harvesting approaches may be categorized in terms of physical size and the transduction approach. To match a generator and the load impedances for optimal power transfer, a power converter is generally inserted between the generator and the load. Due to their simplicity, pulse width-modulated (PWM) converters have been the preferred choice for the matching function. Multiples of the "power chips" to increase output for much larger loads may be used.

SUMMARY OF THE INVENTION

An integrated resonant (standing wave) generator system includes a substrate, a plurality of micro generators disposed on the substrate, the micro generators each generating a voltage output in response to vibrational energy received from a source creating standing waves. At least one power processor is disposed on the substrate, the power processor electrically coupled to outputs of the plurality of micro generators. When the conditions change, the power processor can dynamically adjust its switching functions, such as the on time, off time, period, or phase to maximize the power delivered to a load or energy storage reservoir. The plurality of micro generators can collectively provide a resonance and standing wave frequency. The substrate is of a suitable conductor.

BRIEF DESCRIPTION OF DRAWING

The invention will be understood further from the drawings and description wherein:

FIG. 1 shows a standing wave power generator useful for the present invention; and FIG. 2 is a schematic of a system for charging a cell phone in accordance with the present invention.

DETAILED DESCRIPTION

The power processor preferably includes structure for providing a dynamically adjustable switching function. In one embodiment, the power processor includes a rectifier for providing a rectified output voltage from the voltage output by the micro generators and a controller which includes a peak detector, where dynamic switching of the power processor is based on the peak detector determining instants when the rectified voltage is at a peak value. In another embodiment, the power processor includes a controller which dynamically adjusts an input impedance of the power processor, the input impedance dynamically matching, such as being the complex conjugate, of the output impedances of the plurality of micro generators. In yet another embodiment, the power processor includes a controller which dynamically maximizes charge transferred into a load or an energy reservoir.

The plurality of micro generators are interconnected to form sub-arrays comprising groups of micro generators. In this embodiment, the power processor can include a plurality of reconfigurable switches, the plurality of reconfigurable switches allowing the sub-arrays to comprise dynamically alterable groupings of individual micro generators.

The switching frequency of the power processor can be adjusted for maximum performance. In addition, the inductor provided by the power processor can utilize an inductor having an inductance of a value to allow peak performance, thus making on chip integrating practical for the invention. The system can provide power conversion efficiency.

An integrated standing wave generator array includes a plurality of micro generators disposed on a substrate, the micro generators each generating a voltage output in response to standing wave energy received. At least one summing node is disposed on said substrate, the summing node being electrically coupled to outputs of the plurality of micro generators. The plurality of micro generators can collectively provide more collectively than singularly. The said substrate is a suitable die.

A method of generating electrical energy from standing wave energy includes the steps of providing an integrated resonant generator system comprising a substrate, a plurality of micro generators disposed on the substrate, the micro generators each generating a voltage output in response to vibrational energy received. At least one power processor is disposed on the substrate, the power processor being electrically coupled to outputs of the plurality of micro generators.

The system is subjected to standing wave energy, and provides electrical energy originating at the plurality of voltage outputs.

The method can include the steps of sensing a change in standing wave energy and dynamically adjusting a switching function of the power processor to maximize power delivered to a load or an energy storage device. The method can include the step of dynamically reconfiguring at least one connecting between said pluralities of micro generators to form dynamically alterable sub-arrays of micro generators.

The invention provides a system architecture which permits efficient standing wave (sound, electro magnetic and magnetic standing wave) energy conversion using inductances in the power converters. This aspect of the invention satisfies the stringent size/weight requirements in micro-energy harvesting and permits compatibility with fabrication processing. The power processor is preferably dynamically modifiable. Thus, when conditions change, the change is sensed and the power processor can dynamically adjust its switching functions, such as via the on time, off time, period, or phase to maximize the power delivered to a load or energy storage reservoir.

As noted above, a power converter is needed to ensure maximal power extraction in the presence of standing waves or a non-deterministic spectrum in the energy source. The power converter needs to be small, such using an inductance in the sub-micro Henry range to permit practical on-chip integration. In addition, to provide maximal power conversion efficiency, the power converter should be operating at a suitable frequency for peak performance.

Energy is extracted in the form of standing wave conversion to generate standing wave's energy to a form suitable for human use as an energy source. The short standing wave period allows the inductor to be small to facilitate on-chip integration.

Referring to FIG. 2, this figure shows waves of a person talking into a cell phone and sound waves produced in the environment to send electrical current back to the cell phone's battery to extend the time between battery charging requirements of the cell phone. The microphone in the cell phone oscillates in response to sound waves from the person speaking into it or from sound waves from the environment of the cell phone interacting with the cell phones microphone. The oscillation is used to generate an electric current which is routed back to the cell phones battery and charging the battery. This will extend the life of the cell phones battery and interval between having to recharge the battery of the phone by more traditional means now in use.

Theoretical aspects of the present invention include, for example, holding a sea shell to the ear produce a definite, reproducible sound. Where does this sound come from? The explanation of this sound phenomenon is that in our surroundings, there exists always a certain level of noise. The shell acts as a resonator which amplifies the sound at specific frequencies, which are given by the dimension and the shape of the shell. The acoustic kinetic energy conversion utilizing this accepted principal in a natural or synthetic engineered design based on this principle of physics can be used in a utility to produce induction current.

One can start the exploration of the sound of sea shells by the very simple experiment that one holds a hand (formed as a cup) close to the ear. One can hear some sound. The effect is much more pronounced when on take a larger resonator, for example a cylindrical tube. Holding the tube very close to the ear changes the sound to lower frequencies. This can easily be understood and is also explained in every textbook on acoustics. Standing waves build up in the tube, and the frequencies of the fundamental and the higher modes (overtones) are related to the length L of the tube, and are given by $fn=.c/2L$ for a tube open at both ends (c is the speed of sound), and for a tube closed at one end. $Fn=(2n-1).c\,4L$.

The "acoustical length" of a pipe is a bit longer than the real length giving rise to a slightly deeper tone. The fundamentals are clearly visible, and, naturally, the frequency of the larger shell is lower than that of the small shell. Due to the complicated geometry of the shells, the overtones are not multiples of the fundamental. One can be tempted to read off a similarity to the law of a tube. This mixture of overtones which are not perfect multiplies of the fundamentals and the appearance of rather broad resonances give rise to the impression of a non-technical, natural sound, as from the sea; thus we finally come back to our headline. We believe this same phenomenon to be reproducible with an acoustic source and a speaker whereas the source drives the speaker to vibrate at an equal or near equal frequency to provide an electric current. Instead of an electric current causing the speaker diaphragm to vibrate, the process is reversed to have the speaker produce a current. Of course to be of significance and be practical, this has to be done on a nanotech scale.

Another model would be a sea shell and the human ear. The sound you hear in the shell is actually your middle ear's ear drum vibrating and making the 3 bones of the middle ear magnify that energy and converting it into another form of kinetic energy; into a reciprocating motion whereas the stapes would be a magnet reciprocating inside a conductive coil needed to produce an induction current. A blueprint is now available. Using the human ear as a blueprint, suitable materials are used in place of living tissue and bone so that a conductor coil surrounds that which was the stapes bone. As the stapes (magnet now) reciprocates inside the coil in response to the vibrations from the driver shaped according to the acoustic principles of you being able to hear the ocean in a sea shell, an induction current is produced.

This large model is made nanotech small so that many numbers of these conversions of kinetic energy will take place on a scale of a microchip providing ample current for the load to be worked with. These power chips may be made to work in multiples of chips arranged in such a way so that their output is additive to produce varying amounts of current to meet any load demand. An integrated acoustic generator system includes a substrate, a plurality of micro generators (conversion utilizes) disposed on the substrate, the micro generators each generating a voltage output in response to acoustic vibrational energy received from an acoustic source such as but not limited to the blueprint as set forth in a conch shell or a design based on the abstract above and at least one power processor disposed on the substrate. The power processor electrically coupled to outputs of the plurality of micro generators. When the input or load conditions change, the power processor can dynamically adjust its switching functions to optimize the power delivered to a load or energy storage reservoir.

It is to be understood that while the invention has been described in conjunction with the preferred specific embodiments thereof, that the foregoing description as well as the examples are intended to illustrate and not limit the scope of the invention. Other aspects, advantages and modifications within the scope of the invention will be apparent to those skilled in the art to which the invention pertains.

We claim:

1. An integrated acoustically generator-based system, comprising a substrate, a plurality of micro generators (conversion apparatus) disposed on said substrate, said micro generators each generating a voltage output in response to acoustic vibrational energy received from the acoustic source, and at least one power processor disposed on said substrate, said power processor electrically coupled to outputs of said plurality of micro generators.

2. The system of claim 1 wherein said plurality of micro generators collectively provide induction current.

3. The system of claim 1 wherein said power processor includes structure for providing a dynamically adjustable switching function.

4. The system of claim 3 wherein said power processor includes a rectifier for providing a rectified output voltage from said voltage output and a controller which includes a peak detector, dynamic switching of said power processor being based on said peak detector determining instants when said rectified voltage is a at a peak value.

5. The system of claim 3 wherein said power processor includes a controller which dynamically adjusts an input impedance of said power processor, said input impedance dynamically matching output impedances of said plurality of micro generators.

6. The system of claim 3 wherein said power processor includes a controller which dynamically maximizes charge transferred into a load or an energy reservoir.

7. The system of claim 1 wherein said substrate is a suitable design to allow conductor pathways and secure locations for the generators and acoustic sources.

8. The system of claim 1 wherein said plurality of micro generators are interconnected to form sub-arrays comprising groups of said plurality of micro generators.

9. The system of claim 8 wherein said power processor includes a plurality of reconfigurable switches, said plurality of reconfigurable switches dynamically alterable groupings of said plurality of micro generators to form reconfigurable ones of said sub-arrays.

10. The system of claim 1 wherein said power processor provides an inductor, wherein an inductance of said inductor is suitable for conditions.

11. The system of claim 5 wherein said system provides a power conversion.

12. An integrated acoustic generator array, comprising a plurality of micro generators disposed on a substrate, said micro generators each generating a voltage output in response to vibrational energy received, and at least one summing node disposed on said substrate, said summing node electrically coupled to output of said plurality of micro generators.

13. The array of claim 12 wherein said plurality of micro generators collectively provide an induction current.

14. The array of claim 13 wherein said substrate is a suitable material lending itself to nanotech manufacture.

15. A method of generating electrical energy from vibrational (acoustic) energy, comprising the steps of providing an integrated acoustic resonance generator system comprising a substrate, a plurality of micro generators disposed on said substrate, said micro generators each generating a voltage output in response to vibrational energy received, and at least one power processor disposed on said substrate, said power processor electrically coupled to outputs of said plurality of micro generators, subjecting said system to vibrational energy, and providing electrical energy from said plurality of voltage outputs.

16. The method of claim 15 wherein said plurality of micro generators collectively provide much more inductive current collectively than singularly.

17. The method of claim 16 further comprising the steps of sensing a said vibrational (acoustical driven) energy and dynamically adjusting a switching function of said power processor to maximize power delivered to a load or an energy storage device.

18. The method of claim 16 wherein said substrate is a suitable material to house generators, accessories, and conductive pathways die.

19. The method of claim 16 further comprising the step of dynamically reconfiguring at least one connection between said plurality of micro generators.

\* \* \* \* \*